United States Patent
Kim et al.

(10) Patent No.: US 9,476,745 B2
(45) Date of Patent: Oct. 25, 2016

(54) FLOWMETER USING ULTRASONIC TRANSDUCER

(71) Applicant: Soongsil University Research Consortium Techno-Park, Seoul (KR)

(72) Inventors: Jin Oh Kim, Seoul (KR); Dae Jong Kim, Siheung-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/873,341

(22) Filed: Oct. 2, 2015

(65) Prior Publication Data
US 2016/0097663 A1   Apr. 7, 2016

(30) Foreign Application Priority Data
Oct. 2, 2014   (KR) .................. 10-2014-0132982

(51) Int. Cl.
*G01F 1/66*   (2006.01)

(52) U.S. Cl.
CPC ............... *G01F 1/662* (2013.01); *G01F 1/667* (2013.01)

(58) Field of Classification Search
CPC ........................................................ G01F 1/66
USPC ............................ 73/861.28, 861.27, 861.25
See application file for complete search history.

(56) References Cited

U.S. PATENT DOCUMENTS

| | | | | |
|---|---|---|---|---|
| 4,930,358 A | * | 6/1990 | Motegi .................. | G01F 1/667 73/861.28 |
| 2009/0007694 A1 | * | 1/2009 | Breeuwer .............. | G10K 11/02 73/861.25 |
| 2012/0255360 A1 | * | 10/2012 | Tippit, Jr. ............ | G01N 29/221 73/620 |
| 2012/0266679 A1 | * | 10/2012 | Ao .......................... | G01F 1/668 73/644 |
| 2013/0218490 A1 | * | 8/2013 | Poirier ................. | G01N 29/069 702/56 |
| 2014/0020478 A1 | * | 1/2014 | Ao .......................... | B06B 3/00 73/861.27 |

FOREIGN PATENT DOCUMENTS

| | | |
|---|---|---|
| JP | S59-040250 A | 3/1984 |
| KR | 10-2010-0109232 A | 10/2010 |
| KR | 10-2013-0143450 A | 12/2013 |
| KR | 10-1360363 B1 | 2/2014 |

* cited by examiner

*Primary Examiner* — Jewel V Thompson
(74) *Attorney, Agent, or Firm* — Pearne & Gordon LLP

(57) ABSTRACT

There is provided a flow meter using at least one ultrasonic transducer. The flow meter includes an ultrasonic transducer, a wedge that has a sloped surface formed on a top portion of the wedge and oblique with respect to a downward direction, and a dented portion formed in a half-cylinder shape along a longitudinal direction of the sloped surface; and a rotation portion that has a plane section where the ultrasonic transducer is positioned, and a curved section extended from two opposite edges of the plane section and curved in a semi-circular shape to be contacted with the dented portion.

7 Claims, 6 Drawing Sheets

(a)

(b)

__US 9,476,745 B2__

FLOWMETER USING ULTRASONIC TRANSDUCER

CROSS-REFERENCE TO RELATED APPLICATION

This application claims the benefit of Korea Patent Application No. 10-2014-0132982 filed on Oct. 2, 2014, the disclosure of which is incorporated herein by reference.

TECHNICAL FIELD

The embodiments described herein pertain generally to a flow meter using an ultrasonic transducer.

BACKGROUND

An ultrasonic flow meter using a propagation time difference of an ultrasonic wave has been widely used in order to measure a flow rate of fluid flowing through a pipe.

The ultrasonic flow meter may be classified into a dry flow meter and a wet flow meter depending on a method of attaching an ultrasonic transducer. That is, the wet flow meter uses a method of boring a pipe, through which fluid flows, to insert an ultrasonic transducer into the pipe, whereas the dry flow meter uses a method of attaching an ultrasonic transducer onto an external wall of a pipe.

The wet ultrasonic flow meter is advantageous in that the flow meter directly contacts fluid to allow propagation only through the fluid, and uses a slope splitting method that splits a pipe along a radial direction of the pipe to facilitate measurement of a velocity of fluid flowing at boundaries of an internal wall of the pipe, and thereby, reducing a flow rate measurement error. The wet flow meter may be suitable for an off-the-shelf flow meter where an ultrasonic transducer may be pre-assembled in a pipe (a flow rate measurement pipe) prior to installation of the pipe, whereas the wet flow meter may not be fully suitable for a field construction where the wet flow meter needs to be coupled to an already existing water pipe or other fluid flowing pipes as a flow rate measurement pipe. Further, in case of the wet flow meter, since the ultrasonic transducer is inserted into the pipe, a flow rate measurement error may occur when a scale is formed, or foreign substance is attached to the vicinity of the transducer, as a result of which, the use of the dry ultrasonic flowmeter, which attaches an ultrasonic transducer onto an external wall of a pipe, tends to increase these days.

However, the existing dry ultrasonic flow meter has also been found to be problematic due to the difficulty of applying the slope splitting method to the situation where multiple pairs of ultrasonic transducers are provided to construct a multi-point ultrasonic flow meter. Typically a pair of ultrasonic transducers configuring a measurement line is arranged in an oblique relationship with respect to a flow direction of fluid. The dry ultrasonic flow meter has been found to be suitable for a method (a circumference splitting method) where a virtual straight line (a propagation path of an ultrasonic wave) connecting the pair of the ultrasonic transducers is set to pass through a center of a pipe. On the other hand, setting the straight line to pass through a boundary part of the pipe, instead of passing through the center of the pipe, has been found to be not easy. Accordingly, the dry ultrasonic flow meter has also revealed a problem in the measurement of a flow rate due to the limit in determining a flow rate at the boundary part of the pipe that significantly affects the flow rate of fluid.

In order to solve this problem, Korean Patent No. 10-1360363 (Title of Invention: Ultrasonic Sensor Unit Capable of Adjusting Incidence Angle and Dry Ultrasonic Flow Meter Using the Same) describes a wedge, of which at least part of a top surface is in an arc form, a mounting section that rotates along the top surface of the wedge to adjust an angle for generation of an ultrasonic wave, and an ultrasonic sensor mounted on the mounting section.

However, above-cited Korean Patent No. 10-1360363 has shortcoming that an ultrasonic wave cannot be easily transmitted and received since the top surface of the wedge is formed to have a certain curvature and the ultrasonic transducer cannot fixedly contact with the top surface of the wedge.

SUMMARY

In view of the foregoing, example embodiments provide a flow meter using an ultrasonic transducer, which is capable of adjusting a direction of an ultrasonic wave generated from the ultrasonic transducer, and maximizing an area the ultrasonic transducer makes contact with.

In one example embodiment, there is provided a flow meter using the ultrasonic transducer. The flow meter using the ultrasonic transducer includes the ultrasonic transducer, a wedge that has a sloped surface formed on a top portion of the wedge and oblique with respect to a downward direction, and a dented portion formed in a half-cylinder shape along a longitudinal direction of the sloped surface; and a rotation portion that has a plane section where the ultrasonic transducer is positioned, and a curved section extended from two opposite edges of the plane section and curved in a semi-circular shape to be contacted with the dented portion.

In accordance with the example embodiments, the flow meter using the ultrasonic transducer can adjust the direction of the ultrasonic wave generated from the ultrasonic transducer by adjusting an angle of an rotation portion, which can be applied to pipes formed of various materials. Further, the ultrasonic transducer and the rotation portion make an area contact, by which the ultrasonic wave can be easily transmitted and received.

BRIEF DESCRIPTION OF THE DRAWINGS

FIG. 1(a) shows two flow meters installed with Z-path configuration, and FIG. 1(b) shows two flow meters installed with V-path configuration.

DETAILED DESCRIPTION

Figure 1:
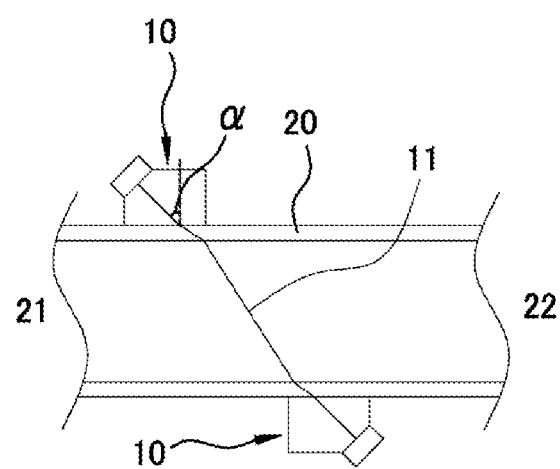
FIG. 1 shows a method of installing a flow meter using an ultrasonic transducer in accordance with an example embodiment, where
Figure 1:
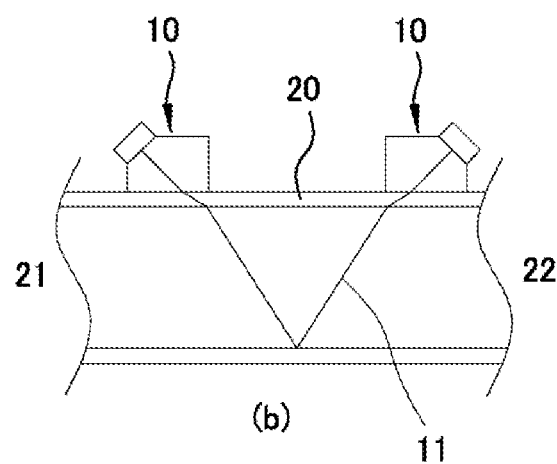

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operations, and/or the existence or addition of elements are not excluded in addition to the described components, steps, operations and/or elements. Throughout the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. Throughout the whole document, the term "step of" does not mean "step for."

The present disclosure relates to a flow meter that is installed outside the pipe, through which fluid flows, to measure an amount of the fluid by using an ultrasonic wave.

FIG. 1 shows a method of installing the flow meter by using an ultrasonic transducer in accordance with an example embodiment.

Referring to FIG. 1, the present flow meters 10 are engaged with an upstream side 21 and a downstream side 22 of a pipe 20, respectively, while being spaced from each other. In addition, the flow meter 10 positioned in the upstream side 21 makes the ultrasonic wave 11 incident into the pipe 20, and the flow meter 10 positioned in the downstream side 22 receives the ultrasonic wave 11 incident from the flow meter positioned in the upstream side 21 so as to measure a flow rate of fluid flowing in the pipe 20.

By way of example, as illustrated in (a) of FIG. 1, the present flow meter 10 may be installed such that an ultrasonic wave 11 has a Z-PATH. Also, as illustrated in (b) of FIG. 2, the present flow meter 10 may be installed such that an ultrasonic wave 11 has a V-PATH.

Hereinafter, the flow meter using the ultrasonic transducer (hereinafter, referred-to as 'the present flow meter') in accordance with an example embodiment is described.

Figure 2:
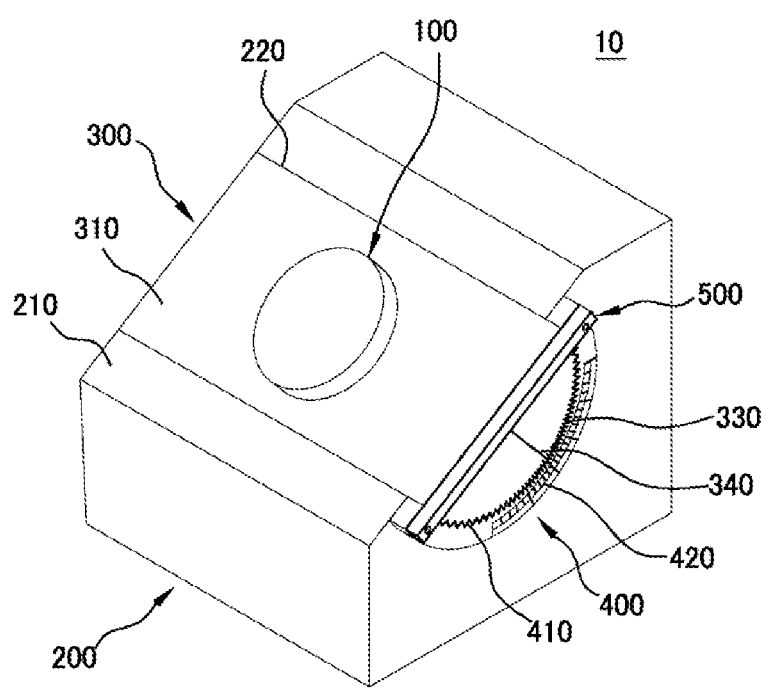
FIG. 2 is a perspective view of the flow meter using the ultrasonic transducer in accordance with an example embodiment.

Referring to FIG. 2, the present flow meter 10 includes the ultrasonic transducer 100, a wedge 200, and a rotation portion 300.

The ultrasonic transducer 100 may generate or receive an ultrasonic wave 11 in order to measure an amount of fluid flowing in the pipe 20. In this case, the ultrasonic transducer 100 may be a piezoelectric transducer, in which when a preset voltage signal is applied, the voltage signal is converted into an ultrasonic signal.

The wedge 200 has a sloped surface 210 formed on a top portion of the wedge 200 and oblique with respect to a downward direction, and a dented portion 220 formed in a half-cylinder shape along a longitudinal direction of the sloped surface 210.

The above-mentioned longitudinal direction may be an axial direction from the direction of 10 o'clock toward the direction of 4 o'clock in FIG. 2.

By way of example, as illustrated in FIG. 2, the wedge 200 may be manufactured in a rectangular parallelepiped shape, and one of upper edges thereof may be chamfered to form the sloped surface 210. In addition, the dented portion 220 may be formed in a half cylinder shape having a certain curvature toward an inward direction with respect to a straight line formed in a longitudinal direction of the sloped surface 210. For example, the dented portion 220 may be in the half cylinder shape with the longitudinal axis of the dented portion 220 parallel to the longitudinal direction of the sloped surface 210.

In addition, the shape of the wedge 200 is not limited to the rectangular parallelepiped shape, and a surface of the wedge 200, on which the pipe 20 makes contact, may be formed to have the same curvature as that of the pipe 20, to enable the wedge 200 to be stably connected with the pipe 20.

The rotation portion 300 has a plane section 310, on which the ultrasonic transducer 100 is positioned, and a curved section 320 extended from two opposite edges of the plane section 310 and curved in a semicircular shape to form the half cylinder shape to be contacted with the dented portion 220. Also, the rotation portion 300 may be inserted into the dented portion 220 of the wedge 200 and rotated with respect to an axis formed in the longitudinal direction of the wedge 200.

Desirably, the curved section 320 of the rotation portion 300 is formed to have the same curvature as that of the dented portion 220, such that the rotation portion 300 can be inserted into the dented portion 220 so as to be easily rotated.

In this case, as the rotation portion 300 is rotated, an angle of the ultrasonic transducer 100 is adjusted since the orientation of the plane section 310 on which the ultrasonic transducer 100 is positioned is adjusted. As a result, a path of the ultrasonic wave 11 generated from the ultrasonic transducer 100 is also adjusted in terms of an angular direction. In this case, the angle as mentioned above may be defined as an angle between the ultrasonic wave 11 prior to being incident into the pipe 20 and a plane that is vertical to the longitudinal direction (a flow direction of fluid) of the pipe 20. For example, the angle may be a as indicated in (a) of FIG. 1.

Figure 4:
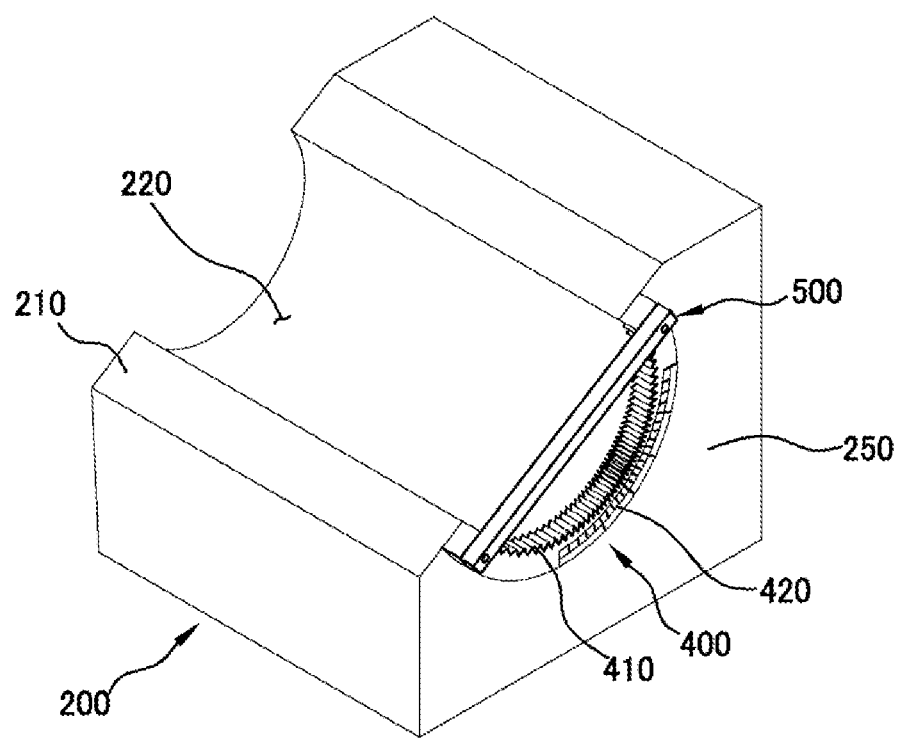
FIG. 4 is a perspective view of a wedge in accordance with an example embodiment.
Figure 5:
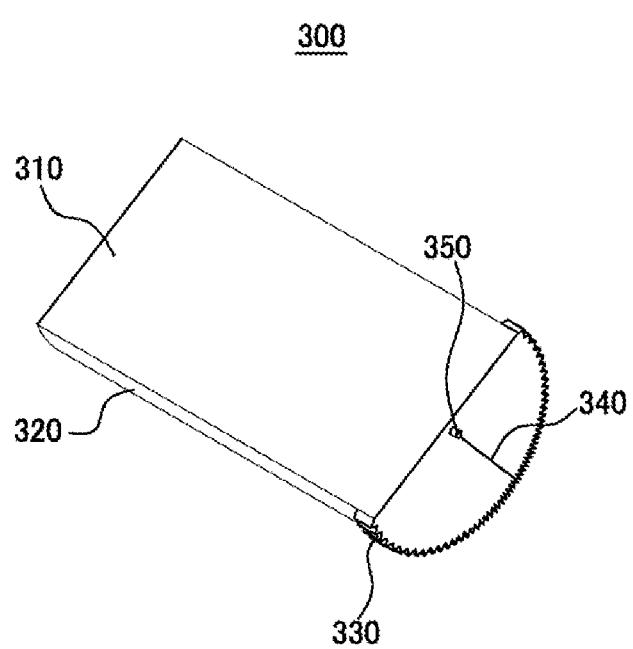
FIG. 5 is a perspective view of a rotation portion in accordance with an example embodiment.

Referring to FIG. 5, one end portion of the curved section 320 of the rotation portion 300 may be formed with a number of tooth portions 330. Referring to FIG. 4, the wedge 200 may include a support portion 400, which is fixed onto one side surface of the wedge 200 and formed with a multiple number of tooth grooves 410 configured to receive the number of tooth portion 330. As shown in FIG. 5, the number of tooth portion 330 may include a plurality of teeth.

The one side surface of the wedge 200 as mentioned above may be a surface 250 positioned in the 4 o'clock direction, and may include a semi-circle cross section as shown in FIGS. 2 and 4.

In case the number of tooth portion 330 is fixedly received by the tooth grooves 410, the rotation portion 300 may also be fixed. As such, the rotation portion 300 may not be rotated.

For example, a user may remove the number of rotation portion 300 from the tooth grooves 410 and rotate the rotation portion 300 by a desired angle, and then, insert the number of tooth portion 330 back into the tooth grooves 410, so that the rotation portion 300 is, without further being rotated, fixedly positioned at the angle designated by the user.

An angle meter 420 may be provided on the one side surface of the support portion 400 to indicate an incident angle α of the ultrasonic waver emitted from the ultrasonic transducer 100, and an indication line 340 may be displayed on the one side surface of the rotation portion 300 to indicate the direction that the ultrasonic wave 11 is generated.

Figure 3:
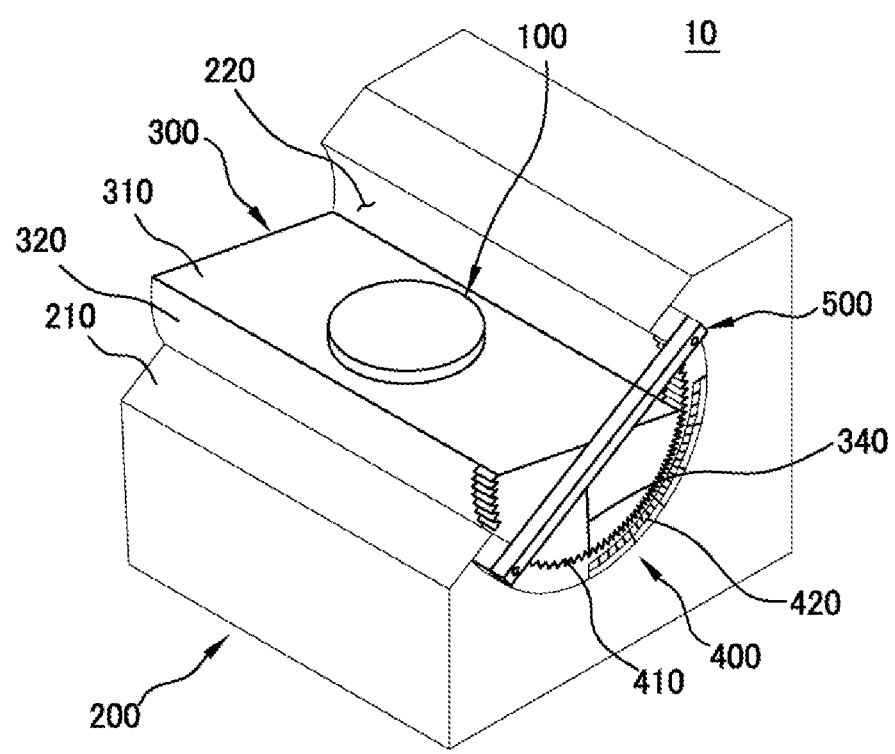
FIG. 3 is a perspective view for describing operation of the flow mater using the ultrasonic transducer in accordance with an example embodiment.

Referring to FIG. 3, in case of adjusting an angle of the ultrasonic wave 11 generated from the ultrasonic transducer 100, the angle of the ultrasonic transducer 100 may be adjusted by moving the rotation portion 300 in a right direction (the 4 o'clock direction of FIG. 3). For example, the rotation portion 300 may be moved in a direction parallel to the longitudinal direction of the rotation portion 300. In one example, the rotation portion 300 may move to the right to be removed from the support portion 400. Subsequently, the rotation portion 300 may be rotated to make the indication line 340 displayed in the rotation portion 300 indicate a user's desired angle of the angle meter 420, and thereafter, move the rotation portion 300 back to the left (the 10 o'clock direction of FIG. 2) to receive the number of tooth portion 330 into the tooth grooves 410 so as not to rotate the rotation portion 300.

The angle meter 420 may display an angle between zero (0) and 90 degrees, where the zero (0) degree, for example, may correspond to the direction where the ultrasonic wave 11 is perpendicular to the fluid flowing direction.

As illustrated in FIG. 5, the rotation portion 300 may be formed with the number of tooth portions 330 along a circumferential surface of the one side end of the curved section 320. In addition, as illustrated in FIG. 4, the support portion 400 may be formed with the number of tooth grooves 410 to receive the corresponding tooth portions 330. However, the present disclosure is not limited thereto, and the rotation portion 300 may be formed with the number of tooth portion 330 positioned at an end of the indication line 340, and the support portion 400 may be formed with a multiple number of tooth grooves 410 continuously dented in a shape corresponding to the number of tooth portion 330 at the part where the angle meter 420 is displayed.

In addition, the angle of the ultrasonic wave 11 generated from the ultrasonic transducer 100 may be finely adjusted by adjusting the dimension of the tooth portion 330.

By way of example, if the number of tooth portion 330 is formed having an angle of 5 degrees, an angle of the ultrasonic wave 11 may be adjusted in a unit of 5 degrees. If the tooth portion 330 is formed having an angle of a 1 degree, an angle of the ultrasonic wave 11 may be adjusted in a unit of a 1 degree.

The present flow meter 10 may further include a fixing portion 500 that fixes the rotation portion 300 to the wedge 200.

The fixing portion 500 may be in contact with the one side surface of the rotation portion 300 and be fixed to the one side surface of the support portion 400.

By way of example, the fixing portion 500 may be fixed to the one side surface of the support portion 400, to prevent the rotation portion 300 from being removed to the right, for example, toward a right direction (the 4 o'clock direction of FIG. 4).

Figure 6:
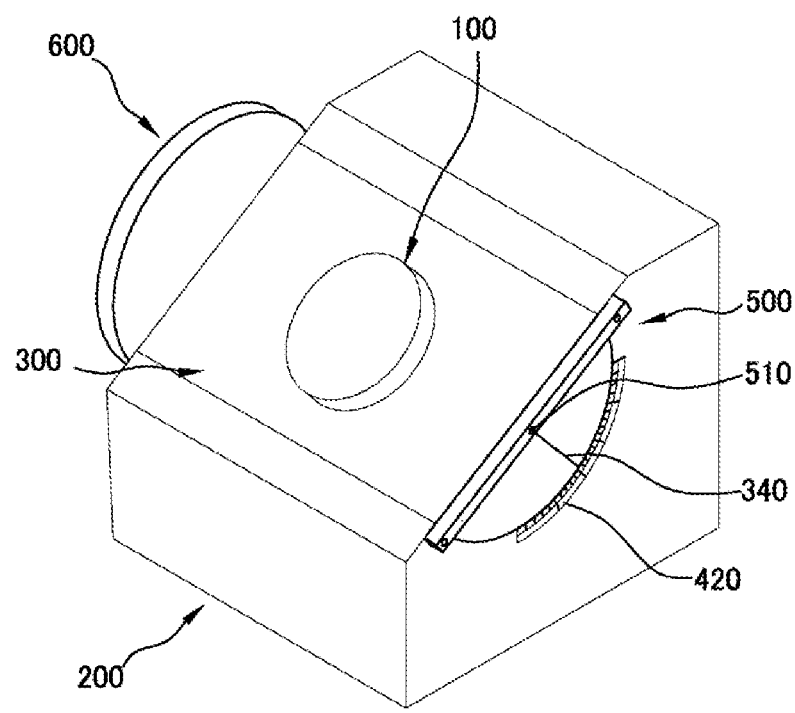
FIG. 6 is a perspective view of a flow meter using the ultrasonic transducer in accordance with another example embodiment.

Referring to FIG. 6, the present flow meter 10 may further include a driving portion 600 that rotates the rotation portion 300.

By way of example, as illustrated in FIG. 6, the driving portion 600 may be positioned on the other side surface of the wedge 200 to rotate the rotation portion 300; however, the present disclosure is not limited thereto, and the driving portion 600 may be positioned in the inside of the wedge 200 to rotate the rotation portion 300.

A user may directly rotate the driving portion 600 to adjust the angle of the rotation portion 300. Also, the driving portion 600 may drive the rotation portion 300 by using an electrical device like a motor. In this case, the driving portion 600 may include an input portion that allows a user to input an angle for rotation of the rotation portion 300, such that a motor is rotated per the angle input received by the input portion, and thereby, adjusting the angle of the rotation portion 300.

On the one side surface of the rotation portion 300, there may be formed a protrusion portion 350 that is positioned along a rotation axis of the rotation portion 300 at a center of a curvature. The fixing portion 500 contacts the one side surface of the rotation portion 300, is fixed to the wedge 200, and is provided with a rotation hole 510, into which the protrusion portion 350 is received. In this case, the angle meter 420 may be displayed at a portion of one side surface of the wedge 200, which is adjacent to the dented portion 220.

The driving portion 600 may include a planetary gear portion.

By way of example, the planetary gear portion may include a sun gear, at least one planetary gear engaged with a sun gear, and a ring gear engaged with a planetary gear to be connected to the rotation portion 300.

In another example, the driving portion 600 may include a Geneva gear.

By way of example, the Geneva gear may include a driving wheel and a driven wheel, in which as the driving wheel rotates, the driven wheel rotates at a certain angle, and the rotation portion 300 connected to the driven wheel can be rotated.

Since the planetary gear and the Geneva gear have been conventionally widely known, detailed description regarding the operation of the planetary gear and the Geneva gear is omitted herein.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

| EXPLANATION OF CODES | |
|---|---|
| 10: Flow meter | 20: Pipe |
| 100: Ultrasonic transducer | |
| 200: Wedge | 210: Sloped surface |
| 220: Dented portion | |
| 300: Rotation portion | 310: Plane section |
| 320: Curved section | 330: Tooth portion |
| 340: Indication line | 350: Protrusion portion |
| 400: Support portion | 410: Tooth grooves |
| 420: Angle meter | |
| 500: Fixing portion | 510: Rotation hole |
| 600: Driving portion | |

We claim:

1. A flow meter using an ultrasonic transducer, comprising:

an ultrasonic transducer;

a wedge that has a sloped surface formed on a top portion of the wedge and oblique with respect to a downward direction, and a dented portion formed in a half-cylinder shape along a longitudinal direction of the sloped surface; and a rotation portion that has a plane section where the ultrasonic transducer is positioned, and a curved section extended from two opposite edges of the plane section and curved in a semicircular shape to be contacted with the dented portion.

2. The flow meter of claim 1, wherein the rotation portion comprises at least one tooth portion formed at the curved section, and a support portion that is fixed to one side surface of the wedge and has a tooth groove formed to correspond to the tooth portion.

3. The flow meter of claim 2, wherein the tooth portion is positioned at one side end of the curved section.

4. The flow meter of claim 2, wherein an angle meter indicating an incident angle of the ultrasonic transducer is displayed at one side surface of the support portion, and an indication line is displayed on the one side surface of the rotation portion to indicate a direction that an ultrasonic wave is generated.

5. The flow meter of claim 1, further comprising a fixing portion that contacts the one side surface of the rotation portion and is fixed to the one side surface of the support portion.

6. The flow meter of claim 1, further comprising a driving portion that rotates the rotation portion.

7. The flow meter of claim 6, wherein a protrusion portion that is protruded at a center of a curvature is formed on the one side surface of the rotation portion, and the fixing portion contacts the one side surface of the rotation portion, is fixed to one side surface of the wedge, and is provided with a rotation hole, into which the protrusion portion is received.

* * * * *